United States Patent [19]
Runavot

[11] Patent Number: 5,117,627
[45] Date of Patent: Jun. 2, 1992

[54] METHOD AND DEVICE TO PROTECT A PROPULSIVE CATALYTIC BED FROM DEGRADING PASSED THROUGH BY A FUEL

[75] Inventor: Jean-Jacques Runavot, Castanet, France

[73] Assignee: Centre National D'Etudes Spatiales, Paris, France

[21] Appl. No.: 603,952

[22] Filed: Oct. 25, 1990

[30] Foreign Application Priority Data

Oct. 27, 1989 [FR] France .................. 89 14146

[51] Int. Cl.$^5$ ............................................. C06D 5/04
[52] U.S. Cl. ..................................... 60/218; 60/203.1
[58] Field of Search ...................... 60/200.1, 203.1, 218

[56] References Cited

U.S. PATENT DOCUMENTS

| | | | |
|---|---|---|---|
| 3,373,769 | 3/1968 | Chavez, Jr. et al. | 137/595 |
| 4,324,096 | 4/1982 | Ellion | 60/218 X |
| 4,517,798 | 5/1985 | Roberts | 60/218 X |
| 4,730,449 | 3/1988 | Cann | 60/203.1 |
| 4,766,724 | 8/1988 | Gruber | 60/203.1 |
| 4,825,647 | 5/1989 | Cann | 60/203.1 |
| 4,930,310 | 6/1990 | McKevitt | 60/271 |

FOREIGN PATENT DOCUMENTS

| | | |
|---|---|---|
| 2399868 | 3/1979 | France . |
| 2455184 | 11/1980 | France . |
| 5892729 | 6/1983 | Japan . |

OTHER PUBLICATIONS

Beitschrift Fur Flugwissenschaften, vol. 6, no. 4, Jul.-/Aug. 1982, pp. 219-224, Breves et al.

Primary Examiner—Peter A. Nelson
Attorney, Agent, or Firm—Michael N. Meller

[57] ABSTRACT

The method consists, by briefly and periodically interrupting feeding of fuel with the aid of the electrovalve (1), of creating sudden pressure oscillations in the injection chamber (3), these oscillations expelling the impurities in a pasty or possible solid state towards the nozzle (6).

Application for space ships.

7 Claims, 1 Drawing Sheet

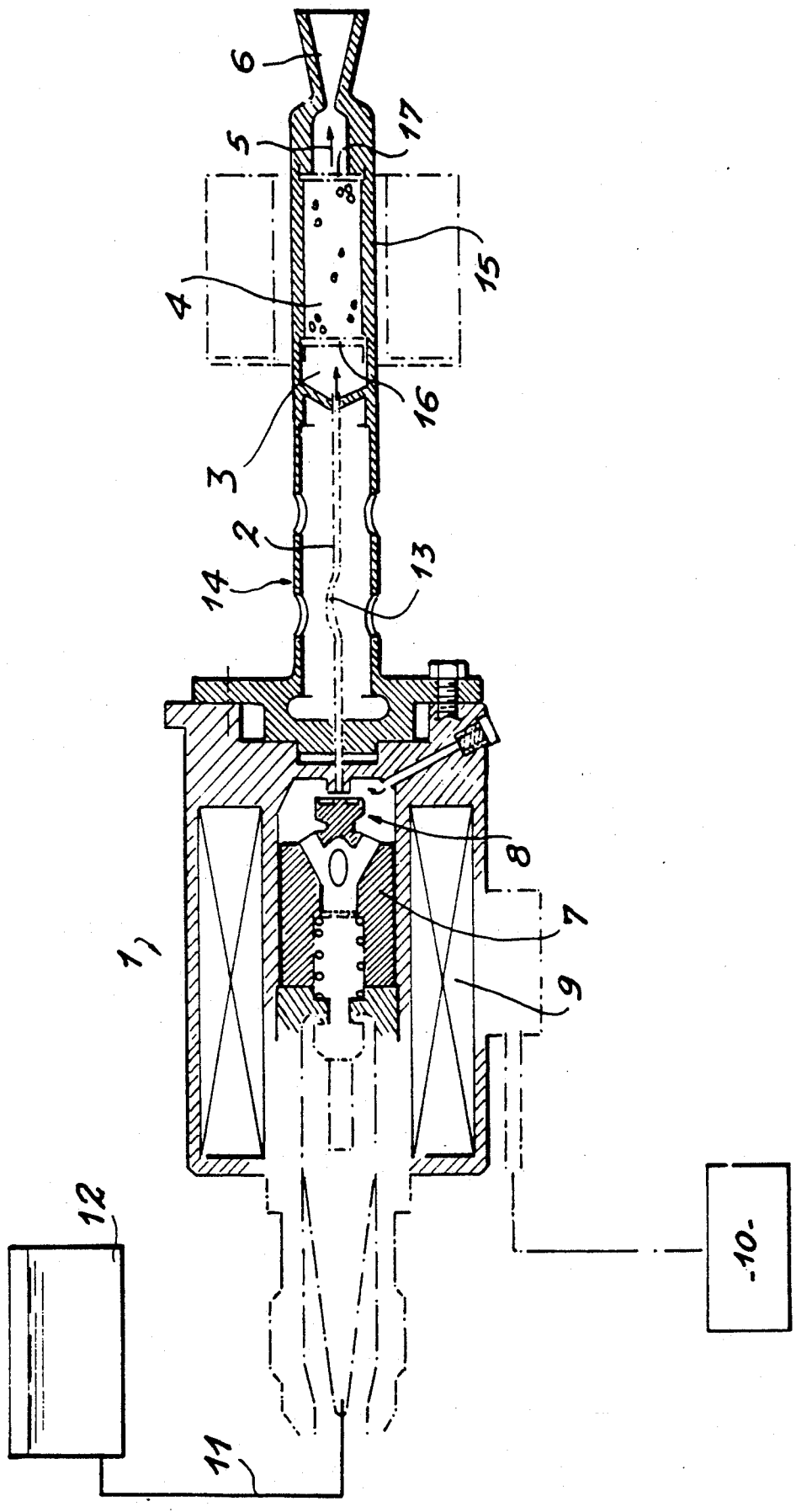

METHOD AND DEVICE TO PROTECT A PROPULSIVE CATALYTIC BED FROM DEGRADING PASSED THROUGH BY A FUEL

FIELD OF THE INVENTION

The invention concerns a method to protect a catalytic propulsive bed from degrading passed through by a fuel, as well as a corresponding device.

BACKGROUND OF THE INVENTION

In certain propulsion units, such as those used for space ships, fuels are made to pass through a catalytic bed so as to decompose them according to an exothermic reaction. The decomposition gases then pass through a nozzle and originate from the thrust of the propulsion unit. The catalytic bed used is normally iridium deposited on porous aluminium grains when the fuel is hydrazine.

BRIEF DESCRIPTION OF THE DRAWING

The FIGURE shows that such a propulsion unit may include from upstream to downstream a bistable electrovalve 1, at least one injection capillary 2, an injection chamber 3, the catalytic bed 4, an expansion chamber 5 and a nozzle 6.

The electrovalve 1 includes, disposed in an armature, a core 7 provided with a head 8 able to be clad onto the inlet of the capillary 2, as well as an induction coil 9 controlled by a control system 10 which provides the excitation voltage. In addition, the electrovalve 1 is provided with a feed pipe 11 which communicates with a hydrazine tank 12 and enables the hydrazine to arrive at the injection capillary 2, if it is not obstructed by the head 8, by passing via the inside of the core 7.

The injection capillary 2 is here shown with one bent back section so as to avoid any rammings of the liquid hydrazine and is surrounded and maintained by an armature 14 rigidly connected to the electrovalve 1 and to the injection chamber 3 and which essentially consists of a perforated tube forming a radiator.

The catalytic bed is contained in a tube 15 and longitudinally compressed between two inlet 16 and outlet 17 grates respectively situated on the injection chamber 3 and the expansion chamber 5.

In normal continuous operation, the hydrazine is sprayed into the injection chamber 3 and droplets strike the inlet grate 16. Only those gases no longer including any hydrazine vapors come out of the outlet grate 17. The temperature of the catalytic bed 4 reaches about 1,000° C. and this temperature is clearly much lower at the inlet of the injection chamber 3 so as to avoid the hydrazine evaporating at this level. The radiator 14 and an adequate flow of cold hydrazine enable the above to occur. On the other hand, transitory thermic and hydraulic phenomena appear, especially in the injection chamber 3, in the pulsed functioning of the electrovalve 1. The extent of these transitory phenomena depends on the conception of the propulsion unit.

It has been established that the effectiveness of the catalytic bed 4 in practice reduces relatively quickly. At the end of several months, in normal working conditions, efficiency losses of up to 20 or 30% have occurred, this proving to be undesirable for satellites whose normal lifespan is several years.

One of the causes of this phenomenon is the progressive fragmentation of the grains of the catalyst or the iridium deposit on account of the number of transitory phenomena and ignitions of the propulsion unit. Another significant cause which the invention seeks to overcome is linked to certain non-volatile dissolved substances contained in the hydrazine and which poison the catalyst. These impurities have an extremely low concentration in the hydrazine used for space ships, but it is impossible to eliminate them completely. The main impurities are the iron present in the electrovalve 1 or the tank 12, as well as the silicon dioxide present in the form of silane in the elastomer membrane which, in the tanks of a large number of space ships, separates the hydrazine from the pressurization gas. The hydrazine is charged with these impurities, thus corroding the surfaces it is soaked in.

During transit in the propulsion unit and with the hydrazine evaporating on the hottest surfaces, the impurities are deposited in a pasty and then solid state, thus creating a gangue more or less hooked to the surfaces according to the temperature and the physico-chemical phenomena involved. These changes of state seem to a large extent to be irreversible.

During stable continuous (several tens of minutes) operations required to correct the inclination of geostationary satellites, the deposit is firstly effected on the grains of the catalytic bed 4. During pulsed operations, especially if the propulsion unit is not relatively stable, the depositing is preferably effected in the injection chamber 3 and at the outlet of the capillary 2, which may therefore be clogged up. In fact, the injection chamber 3 does not then fully benefit from the cooling produced by the supply of the hydrazine and thus heats with respect to continuous functioning with the result that the hydrazine is vaporized prematurely.

Several tens of milligrams of impurities may render low-thrust (about one newton) propulsion units scarcely (hardly) usable.

SUMMARY OF THE INVENTION

The method of the invention makes it possible to avoid the catalytic grains being poisoned by the impurities.

To prevent this poisoning, the continuous mode of operation is replaced by a pseudo-continuous mode of operation in which short periodic interruptions are made when feeding the fuel.

The main phenomenon which appears is a pressure variation in the injection chamber 3 and in the catalytic bed 4: the pressure falls as soon as feeding is interrupted and increases again up to the nominal value of continuous operation as soon as feeding is resumed. These pressure oscillations, which may be assimilated with small explosions at the inlet of the catalytic bed 4, expel the impurities outside said bed, these impurities being then in a pasty state owing to the high temperature in the catalytic bed 4 : the brief interruptions of feeding do not make this temperature vary significantly. The impurities are evacuated via the nozzle 6. In addition, short interruptions of feeding do not suffice to significantly reheat the injection chamber 3 and the outlet of the injection capillary, with the result than soiling on these parts is avoided.

Tests conducted with such a method make it possible to maintain the effectiveness of the propulsion unit and even subsequently of regenerating it after a start of soiling, whereas a gangue has been able to be solidified around the grains of the catalyst on account of periods of the non-use of the propulsion unit.

The system 10 for controlling the electrovalve 1 only requires minor transformations to enable it to be adapted to this method. It merely suffices to add a microprocessor 18 provided with a clock 19 which interrupts at regular intervals the excitation of the coil 9 for a determined period. The microprocessor 18 may be selected from a large number of known hardware items and is relatively easy for a specialist to program. In one specific embodiment, the ARRIS 6100 microprocessor has been used. Other systems, for example those comprising a sweep circuit or switch controlled by a rectangular signal generator, could also be used.

Although there are many satisfactory solutions for implementing the invention, several rules may be formulated. The interruptions may thus be controlled for operating cycles longer than one minute or longer than several minutes. Periodic interruptions may be made about every ten seconds, although there is no clear limit and the interruptions do not have to be made at regular intervals. Intervals from about seven to fifteen seconds ought to give slightly different results.

The period of the interruptions is of greater significance than their interval, as it has been observed that the pressure does not vary significantly if these interruptions are too short. If on the other hand the interruptions are too long, the fall of pressure is separated from the pressure rise by a lapse of time during which the pressure of the vaporized fuel is nil and this may even result in produce the drawbacks of the pulsed mode. In both these cases, the suddenness of the oscillations and the effectiveness of expelling the impurities are reduced. One suitable solution thus consists of adjusting the period of the interruption so that the pressure falls from the corresponding nominal value to a continuous feeding at zero and then rises immediately up to the nominal value. This period is several hundreds of milliseconds. In the particular case of a propulsion unit with a thrust of one half-newton, a sufficient interruption period is from 0.38 to 0.5 or 0.6 seconds.

These various values are of course to be adapted and modified for each particular case. Similarly, other types of fuels and catalysts could be used.

What is claimed is:

1. A method for protecting a catalytic bed against degrading when a fuel, when passing through said bed is decomposed wherein, during the operating cycle of the propulsion unit, short periodic interruptions in feeding the fuel are created, wherein the operating cycle is greater than one minute and wherein each of the interruptions is less than one second in length.

2. Method according to claim 1, wherein the operating cycle lasts for a period exceeding one minute.

3. Method according to claim 1, wherein the fuel is hydrazine and the catalytic bed is comprised of grains coated with iridium.

4. Method according to claim 1, wherein the interruptions are sufficiently short so that the pressure in the catalytic bed, which results from decomposition of the fuel, falls and is immediately followed by a phase in which the pressure rises.

5. A device for protecting a propulsive catalytic bed against degrading when a fuel, when passing through the bed is decomposed, which includes a fuel feeding valve device and means to control said valve wherein, during a propulsion limit operating cycle, said valve is controlled to permit the creation of short periodic interruptions in the feeding of the fuel, wherein the operating cycle is greater than one minute and each of the interruptions is less than one second in length.

6. Device according to claim 5, wherein the fuel is hydrazine and the catalytic bed is constituted by grains coated with iridium.

7. Device according to claim 5, wherein the interruptions are sufficiently short so that the pressure in the catalytic bed falls, which results from decomposition of the fuel, this falling of pressure to be immediately followed by a phase in which the pressure rises.

* * * * *